United States Patent
Büttner et al.

(10) Patent No.: US 9,800,103 B2
(45) Date of Patent: Oct. 24, 2017

(54) MECHANICALLY STABILIZED ROTOR FOR A RELUCTANCE MOTOR

(71) Applicant: SIEMENS AKTIENGESELLSCHAFT, München (DE)

(72) Inventors: Klaus Büttner, Hollstadt (DE); Matthias Warmuth, Windshausen (DE); Norbert Wöhner, Heustreu (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 302 days.

(21) Appl. No.: 14/746,317

(22) Filed: Jun. 22, 2015

(65) Prior Publication Data
US 2015/0372546 A1 Dec. 24, 2015

(30) Foreign Application Priority Data
Jun. 23, 2014 (EP) .................................... 14173482

(51) Int. Cl.
*H02K 1/24* (2006.01)
*H02K 19/14* (2006.01)
*H02K 15/02* (2006.01)

(52) U.S. Cl.
CPC ............. *H02K 1/246* (2013.01); *H02K 15/02* (2013.01); *H02K 19/14* (2013.01); *H02K 15/022* (2013.01); *Y10T 29/49014* (2015.01)

(58) Field of Classification Search
CPC ......... H02K 1/246; H02K 15/02; H02K 19/14
See application file for complete search history.

(56) References Cited

U.S. PATENT DOCUMENTS

| 3,684,906 | A | * | 8/1972 | Lenz | ...................... H02K 17/16 310/61 |
| 4,888,513 | A | * | 12/1989 | Fratta | ...................... H02K 1/246 310/166 |
| 4,924,130 | A | * | 5/1990 | Fratta | ................... H02K 1/2766 310/156.53 |
| 5,818,140 | A | | 10/1998 | Vagati | |
| 5,831,367 | A | * | 11/1998 | Fei | ........................ H02K 1/246 310/162 |

(Continued)

FOREIGN PATENT DOCUMENTS

DE 102013201353 A1 8/2013
GB 1347561 A 2/1974

(Continued)

*Primary Examiner* — Robert W Horn
(74) *Attorney, Agent, or Firm* — Henry M. Feiereisen LLC

(57) ABSTRACT

A rotor for a reluctance motor includes a laminated core having a number of rotor sheet metal blanks. Each rotor sheet metal blank includes flux barriers cast with a non-ferromagnetic casting compound and at least one soft-magnetic rotor sheet which delimits the flux barriers. Flux barriers of adjacent rotor sheet metal blanks are arranged offset relative to one another so that the flux barriers of one of the adjacent rotor sheet metal blanks are delimited in an axial direction at least partially by the rotor sheets of the other one of the adjacent rotor sheet metal blanks, with the casting compound of the flux barriers adhering in an adhesion zone to the rotor sheets.

18 Claims, 7 Drawing Sheets

(56) References Cited

U.S. PATENT DOCUMENTS

| | | | |
|---|---|---|---|
| 6,509,667 B1 * | 1/2003 | El-Antably | H02K 15/02 310/156.21 |
| 6,660,412 B2 * | 12/2003 | Roshen | B32B 7/02 174/391 |
| 6,675,460 B2 * | 1/2004 | Reiter, Jr. | B22F 7/06 148/514 |
| 7,146,708 B2 * | 12/2006 | Reiter, Jr. | B22F 7/064 29/597 |
| 7,560,846 B2 * | 7/2009 | Lee | H02K 1/246 310/162 |
| 8,686,608 B2 * | 4/2014 | Lendenmann | H02K 1/246 310/61 |
| 8,749,109 B2 * | 6/2014 | Lendenmann | H02K 1/246 310/162 |
| 8,836,193 B2 | 9/2014 | Büttner et al. | |
| 8,901,799 B2 * | 12/2014 | Ikaheimo | H02K 1/246 310/216.113 |
| 8,963,394 B2 | 2/2015 | Büttner et al. | |
| 2006/0222528 A1 * | 10/2006 | Shin | H02K 29/12 417/410.5 |
| 2007/0108853 A1 * | 5/2007 | Shah | H02K 1/246 310/61 |
| 2012/0133236 A1 | 5/2012 | Büttner et al. | |
| 2012/0169158 A1 | 7/2012 | Büttner et al. | |
| 2012/0205996 A1 | 8/2012 | Büttner et al. | |
| 2013/0175892 A1 | 7/2013 | Büttner et al. | |
| 2013/0187512 A1 | 7/2013 | Büttner et al. | |
| 2013/0234543 A1 | 9/2013 | Büttner et al. | |
| 2013/0257197 A1 | 10/2013 | Büttner et al. | |
| 2015/0015093 A1 * | 1/2015 | Gontermann | H02K 1/246 310/44 |
| 2015/0162788 A1 * | 6/2015 | Tsai | H02K 15/02 310/46 |
| 2015/0171673 A1 * | 6/2015 | Cioffi | H02K 1/246 310/216.004 |
| 2015/0280498 A1 * | 10/2015 | Kolehmainen | H02K 1/246 310/216.107 |
| 2015/0372546 A1 * | 12/2015 | Buttner | H02K 15/02 310/216.107 |
| 2015/0372577 A1 * | 12/2015 | Haussmann | H02K 1/246 310/211 |
| 2016/0056673 A1 * | 2/2016 | Buttner | H02K 1/246 310/46 |
| 2016/0308408 A1 * | 10/2016 | Ronchetto | H02K 1/22 |
| 2016/0329787 A1 * | 11/2016 | Ito | H02K 1/246 |

FOREIGN PATENT DOCUMENTS

| | | |
|---|---|---|
| JP | H10112965 A | 4/1998 |
| JP | 2002034218 A | 1/2002 |
| JP | 2002095227 A | 3/2002 |

\* cited by examiner

MECHANICALLY STABILIZED ROTOR FOR A RELUCTANCE MOTOR

CROSS-REFERENCES TO RELATED APPLICATIONS

This application claims the priority of European Patent Application, Serial No. EP 14173482.2, filed Jun. 23, 2014, pursuant to 35 U.S.C. 119(a)-(d), the disclosure of which is incorporated herein by reference in its entirety as if fully set forth herein.

BACKGROUND OF THE INVENTION

The present invention relates to a rotor for a reluctance motor, to a reluctance motor with such a rotor, to a motor vehicle, and to a method for manufacturing a rotor.

The following discussion of related art is provided to assist the reader in understanding the advantages of the invention, and is not to be construed as an admission that this related art is prior art to this invention.

JP 2002 095227 A discloses a rotor of a synchronous reluctance motor, wherein the flux blocking zones are cast with artificial resin. The radially adjacent flux conducting sections have trapeze-type recesses, into which the artificial resin likewise flows during casting. The flux conducting sections are connected to the cured artificial resin by way of a dovetail connection. In the presence of high rotary speeds, a tensile force effected by centrifugal forces is thus transferred from the outer periphery of the rotor via the artificial resin inwards toward the shaft. The disadvantage here is that artificial resins can crack under tensile strain. Moreover the trapeze-type recesses in the flux conducting sections impair the efficiency of the motor since the magnetic flux is hindered.

It would be desirable and advantageous to address prior art shortcomings and to provide an improved rotor and improved reluctance motor which are efficient and mechanically stable and yet reliable in operation.

SUMMARY OF THE INVENTION

According to one aspect of the present invention, a rotor for a reluctance motor, includes a laminated core having a number of rotor sheet metal blanks, each rotor sheet metal blank including flux barriers cast with a non-ferromagnetic casting compound and at least one soft-magnetic rotor sheet which delimits the flux barriers, wherein flux barriers of adjacent rotor sheet metal blanks are arranged offset relative to one another so that the flux barriers of one of the adjacent rotor sheet metal blanks are delimited in an axial direction at least partially by the rotor sheets of the other one of the adjacent rotor sheet metal blanks, with the casting compound of the flux barriers adhering in an adhesion zone to the rotor sheets.

The present invention resolves prior art problems by providing a rotor which has a laminated core, i.e. a stack with a number of soft-magnetic rotor sheet metal blanks which are advantageously electrically insulated from one another and which extend each radially away from an axis of rotation of the rotor. Each rotor sheet metal blank includes at least one magnetically conductive rotor sheet to form flux conducting sections, between which flux barriers are disposed. In other words, a rotor sheet metal blank can include an individual rotor sheet with punches for the flux barriers or a number of rotor sheets which are separated from each other by flux barriers, e.g. metal strips. The flux conducting sections can be designed, for example, in the form of strips and/or connect two d-axes of the rotor which are adjacent in the peripheral direction. The flux barriers are cast with a non-ferromagnetic casting compound. The term "non-ferromagnetic" is to be understood to mean in particular not soft-magnetic. The casting compound may have a relative permeability which is less than 100.

In order to mechanically stabilize the rotor, the flux barriers of adjacent rotor sheet metal blanks are arranged in offset relationship so that the flux barriers of one of the rotor sheet metal blanks in the axial direction are at least partly delimited by a respective rotor sheet of the adjacent other rotor sheet metal blank. The casting compound of the flux barrier therefore adheres to the respective axially adjacent rotor sheet in an adhesion zone.

As the rotor rotates, a centrifugal force acts on the individual rotor sheets in each rotor sheet metal blank and pulls the rotor sheets radially outwards away from the axis of rotation. In accordance with the invention, the individual rotor sheets adhere to the casting compound of the adjacent flux barrier across their adhesion zone. As a result, the centrifugal force acting on the respective rotor sheet can be advantageously routed via the adhesive connection onto the casting compound. In this way, a rotor sheet of a rotor sheet metal blank can be held against the centrifugal force by the casting compound glued thereto in the adhesion zone, thereby rendering the rotor more stable with respect to centrifugal forces and thus operational at a higher rotary speed. The force acting on the casting compound is also a shearing force and can therefore be transferred onto the casting compound at much lower risk of breakage than a tensile force, as encountered in conventional rotors.

The flux barriers of adjacent rotor sheet metal blanks can be arranged to be twisted relative to one another about the rotor axis, so that the entire rotor package has an inclination which advantageously corresponds to a tooth pitch of the stator. As a result, torque ripple can be reduced.

According to another advantageous feature of the present invention, the flux barriers of the adjacent rotor sheet metal blanks can be arranged in radially offset relationship to one another. As a result, centrifugal forces, which act on the individual rotor sheets of a rotor sheet metal blank, can be effectively transferred to the shaft. The adhesion zone in the radial extension direction can have a dimension of, e.g., 0.5 millimeters to 5 millimeters.

According to another advantageous feature of the present invention, the rotor sheet can include at least one depression formed by a stamping and/or a recess in the adhesion zone, wherein the at least one depression and the casting compound form a form closure in a radial direction. In other words, the casting compound engages into the rotor sheet. The depression can be a notch or a profile. The depression can be provided by a metal-cutting process, i.e. may involve a recess in the laminated core. Advantageously, the depression is realized by stamping. This non-metal-cutting process only displaces the soft-magnetic material of the rotor sheet. This is advantageous as the magnetically conductive cross-section of the rotor sheet is not reduced by the formation of the depression. The depression may have a depth between 0.05 millimeters and 0.5 millimeters. Currently preferred is a depth of 0.1 millimeters.

In addition to or as an alternative to a depression, provision can be made for the rotor sheet to be roughened in its adhesion zone in relation to a region adjacent to the adhesion zone. An adhesive force, with which the casting compound adheres to the rotor sheet, is increased compared to a smooth, untreated rotor sheet.

Advantageously, the flux barriers of adjacent rotor sheet metal blanks are not completely separated from one another by the offset. Rather, the flux barriers of the adjacent rotor sheet metal blanks can be arranged overlapping in pairs, so that the casting compound of the overlapping flux barriers can establish a single support structure. In other words, the individual flux barriers of the different rotor sheet metal blanks are arranged one behind the other in the axial direction upon threading of the rotor sheets so that flux barriers of the rotor sheet metal blanks which correspond to one another respectively form overall a room or chamber in the laminated core. By effusing this chamber with the casting compound, a rod which penetrates the entire laminated core is produced respectively to establish the single-piece support structure. As a result, the bending moment of the rotor is advantageously increased. Furthermore, the centrifugal force acting on the rotor sheets can be transferred axially to the axial ends of the laminated core via the rod and transmitted onto the shaft via, e.g., stabilizing end disks. The provision of a non-ferromagnetic separator in the interior of the laminated core may also be envisioned to support the rods in the radial direction.

According to another advantageous feature of the present invention, the casting compound can contain an electrically insulating material. As a result, eddy currents between the rotor sheet metal blanks can advantageously be blocked or suppressed. The term "electrically insulated" is hereby to be understood in particular to mean a conductivity of less than 10 Siemens, in particular less than 1 Siemens. Examples of a suitable electrically insulating material includes a polymer, such as an artificial resin, or a ceramic. Artificial resin is particularly advantageous in that it exerts particularly large adhesive forces in the adhesion zone onto the adjacent sheet and can be provided with a relatively large shearing resistance.

According to another advantageous feature of the present invention, the casting compound can contains an electrically conductive material, such as aluminum and/or copper. Aluminum and the copper can also be provided in the form of an aluminum alloy or copper alloy, respectively. The term "electrically conductive" is to be understood in particular to mean a material with a conductivity of more than 100 Siemens, in particular more than 1,000 Siemens. The presence of a casting compound which is electrically conductive is advantageous because of the capability to form cage rods of a squirrel-cage rotor in the laminated core by means of the flux barrier.

According to another advantageous feature of the present invention, the laminated core can have rotor sheet metal blanks with flux barriers at axial ends thereof, with the flux barriers at each axial end being electrically connected to one another by way of a short-circuit ring formed from the casting compound such that overall a start-up cage of the rotor is formed by the casting compound in the laminated core and the short-circuit rings. In other words, the short-circuit rings can be formed from the casting compound. This is advantageous since the start-up cage or short-circuit cage can be formed in the laminated core by a single work step.

In order to form the flux barriers in offset relationship in the laminated core, a particularly tailored soft-magnetic sheet can be provided for each rotor sheet metal blank. It is, however, particularly advantageous when all rotor sheet metal blanks have a same cut. Thus, the use of a great number of same parts can be achieved. A cut is defined by the respective edges of the at least one rotor sheet and the flux barriers and represents a contour overall, i.e. a shape of the cut of each sheet for an individual rotor sheet metal blank. This contour of the rotor sheet metal blanks is hereby the same. In order to realize an offset disposition of the flux barriers relative to each other, the rotor sheet metal blanks can simply be arranged twisted relative to each other. For example, adjacent rotor sheet metal blanks can be the same but have contours which are rotated relative to one another by 90 degrees.

According to another aspect of the present invention, a reluctance motor includes a rotor including a laminated core having a number of rotor sheet metal blanks, each rotor sheet metal blank including flux barriers cast with a non-ferromagnetic casting compound and at least one soft-magnetic rotor sheet which delimits the flux barriers, wherein flux barriers of adjacent rotor sheet metal blanks are arranged offset relative to one another so that the flux barriers of one of the adjacent rotor sheet metal blanks are delimited in an axial direction at least partially by the rotor sheets of the other one of the adjacent rotor sheet metal blanks, with the casting compound of the flux barriers adhering in an adhesion zone to the rotor sheets, and a stator having coils for rotating the rotor at a rotary speed by applying current alternatingly to the coils.

A rotating field can be generated in the stator by the alternating supply of current to the coils. The rotor can be arranged in the stator and can be caused to rotate by the reluctance effect of the rotating field.

According to another advantageous feature of the present invention, the reluctance motor can have a converter configured to alternatingly apply current to the coils and thereby rotate the rotor. The converter is embodied to generate a rotating field in the stator by means of the alternate supply of current to the coils. The rotor arranged in the stator can be caused to rotate by the reluctance effect of the rotating field. The converter can be configured so as to rotate the rotor at a rotary speed of greater than 5000 revolutions per minute. The reluctance motor can thus be used as a drive motor for an electrically driven motor vehicle. A reluctance motor according to the present invention can, however, also be configured, e.g., as a fan drive or compressor drive for industrial applications.

According to still another aspect of the present invention, a motor vehicle includes at least one reluctance motor which includes a rotor having a laminated core with a number of rotor sheet metal blanks, each rotor sheet metal blank including flux barriers cast with a non-ferromagnetic casting compound and at least one soft-magnetic rotor sheet which delimits the flux barriers, wherein flux barriers of adjacent rotor sheet metal blanks are arranged offset relative to one another so that the flux barriers of one of the adjacent rotor sheet metal blanks are delimited in an axial direction at least partially by the rotor sheets of the other one of the adjacent rotor sheet metal blanks, with the casting compound of the flux barriers adhering in an adhesion zone to the rotor sheets, and a stator having coils for rotating the rotor at a rotary speed by applying current alternatingly to the coils.

According to still another aspect of the present invention, a method for manufacturing a rotor includes forming recesses in a soft-magnetic sheet for a rotor sheet metal blanks to establish flux barriers, axially threading a plurality of said sheet such that axially adjacent recesses are arranged partially offset relative to one another so that each of the flux barriers is axially delimited by an adhesion zone of an adjacent one of the sheets, and casting the recesses with a non-ferromagnetic casting compound to thereby arrange the casting compound in the recesses and apply the casting compound to the adhesion zones.

In accordance with a method of the present invention, a soft-magnetic sheet is provided for each rotor sheet metal blank, wherein each sheet has recesses or punches for the flux barriers. The sheets are threaded axially, i.e. strung or stacked one on top of the other in the axial direction. Axially adjacent recesses are arranged offset to each other in pairs, so that each flux barrier is at least partially axially delimited by an adhesion zone of an adjacent sheet. The flux barriers can be cast with a non-ferromagnetic casting compound to thereby arrange the casting compound in the flux barriers and apply it to the adhesion zones of the axially adjacent adjoining sheets.

In order to be able to perform the casting in a single work step, the recesses are advantageously arranged to partially overlap, so that recesses which are arranged flush in the axial direction overall form a through opening or a chamber through the rotor laminated core. This through opening can then be filled with the casting compound from an axial end of the rotor sheet.

In order to separate the sheet of an individual rotor sheet metal blank into several individual rotor sheets which are separate from one another, provision can be made for a metal-cutting process to remove an outer ring of the sheet which runs externally around the periphery, after manufacturing the rotor laminated core and to thereby separate individual flux conducting sections from one another which are formed from the sheet.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
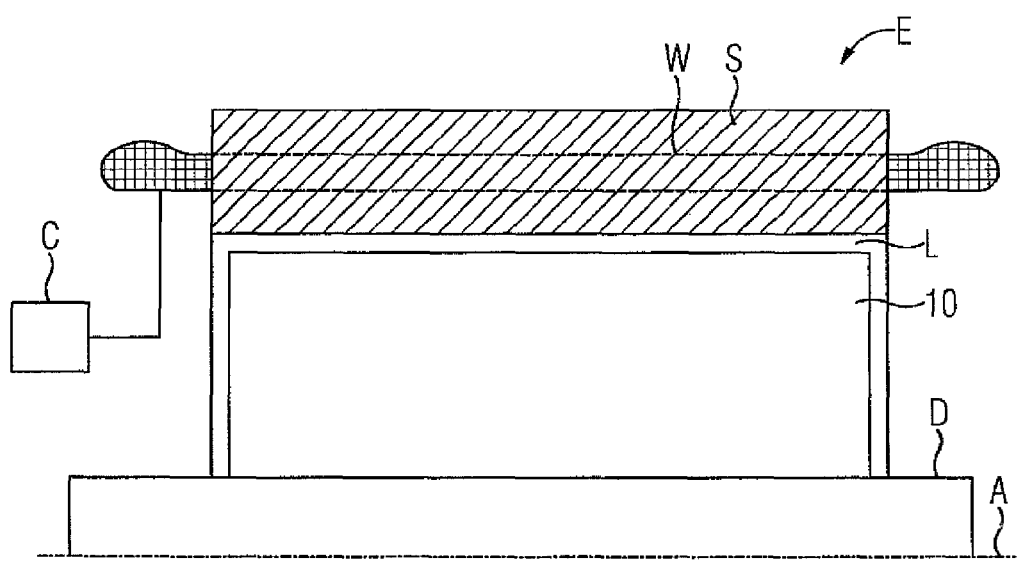
FIG. 1 shows a schematic representation of a one embodiment of a reluctance motor according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the exemplary embodiments, described hereinafter, the components described in the embodiments each represent individual features of the invention to be considered independently of one another, which also further develop the invention independently of one another and are thus also to be regarded as an integral part of the invention individually or in a combination other than that shown. Furthermore, the described embodiments can also be supplemented by further features of the invention which are already described.

Turning now to the drawing, and in particular to FIG. 1, there is shown an electric machine E, which can be e.g. a synchronous reluctance motor or a servomotor. The electric machine E can be embodied for instance as a drive motor for an electric traction drive of a motor vehicle or a fan or compressor drive. FIG. 1 illustrates an axis of rotation A of a rotor 10 of the electric machine E which axis of rotation A also represents an axis of symmetry.

The electric machine E includes a stator S, in which windings W of electrical coils are arranged, wherein only one of the windings W is shown in FIG. 1. The windings W are supplied alternately by a three-phase source C, as a result of which a magnetic rotating field is produced inside the stator S in an air gap L of the electric machine E. The three-phase source C may be for instance an inverter.

The rotor 10, which is connected to a shaft D in a torque proof manner, is located inside of the stator S. The shaft D is mounted rotatably about the axis of rotation A in the stator S. The rotor 10 can be an embodiment of the inventive rotor.

Figure 2:
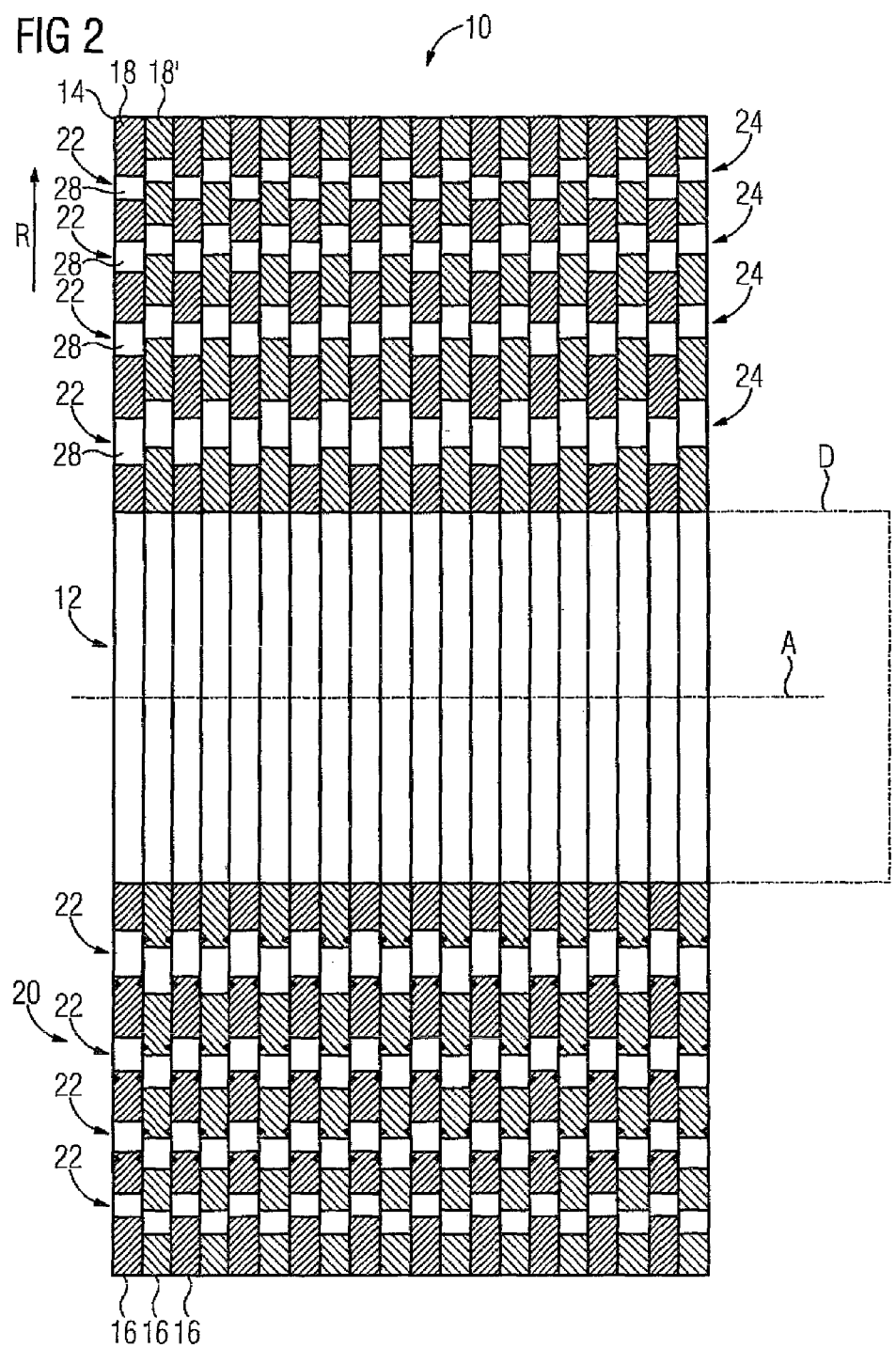
FIG. 2 shows a schematic representation of a longitudinal section of a rotor of the reluctance motor in FIG. 1.

The rotor 10 is shown alone in FIG. 2. The shaft D (only shown with a dashed line in FIG. 2) is inserted through a through opening 12 of the rotor 10. A diameter of the rotor 10 in the radial direction R with respect to the axis of rotation A can amount to more than 20 cm. A length of the rotor 10 in the axial direction can amount to more than 30 cm.

As a magnetically active part, the rotor 10 can comprise a laminated core 14, which may comprise a number of rotor sheet metal blanks or in brief metal blanks 16, which each comprise ferromagnetic, in particular soft-magnetic, material. For the sake of clarity in FIG. 2, only some of the magnetic metal blanks 16 are provided with a reference character. An electrically insulating layer, e.g. a lacquer, is disposed in a known manner between the metal blanks 16 in order to block eddy currents in the laminated core 14. Each metal blank 16 can be formed in the example shown in FIG. 2 by a rotor sheet 18, 18' in each instance. Only the rotor sheet 18 which is disposed on a front face 20 in the axial direction at a front end of the laminated core, and the indirectly adjoining, adjacent rotor sheet 18' are provided in each case with a reference character in FIG. 2.

The rotor sheet 18 (and accordingly also the remaining rotor sheets of the remaining metal blanks 16) has recesses 22, in which barriers for a magnetic flux form, in other words flux barrier regions or flux barriers. The recesses 22 can be formed for instance by punching the corresponding shapes out of the rotor sheet 18.

With the laminated core 14, respectively corresponding recesses 22 of adjacent rotor sheets, in other words also the rotor sheets 18 and 18', are arranged offset relative to one another. The offset is only partial, so that through openings 24 through the laminated core 14 are formed by the recesses arranged axially one behind the other in each instance. The through openings 24 can be cast with a casting compound in the laminated core 14, for instance an electrically insulating material, such as for instance an artificial resin or a ceramic, or an electrically conductive, but non-ferromagnetic material, such as for instance aluminum or an aluminum alloy.

The offset between corresponding recesses of adjacent rotor sheets 18, 18' is radial, i.e. at right angle to the axis of rotation A in the radial direction R.

As explained below with reference to FIG. 3 and FIG. 4, an axial delimitation of the hollow cavity provided by the recess 22 and filled with the casting compound is produced by the radial offset in each recess.

Figure 3:
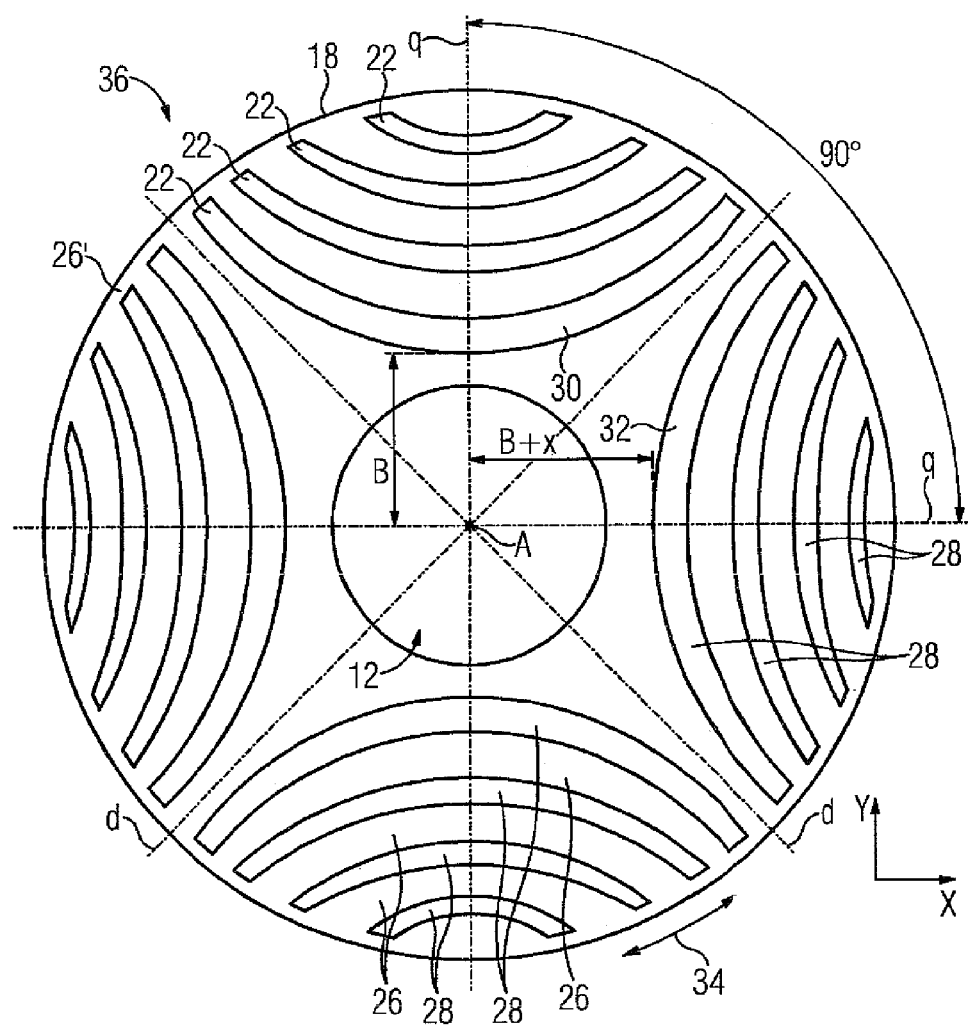
FIG. 3 shows a schematic representation of an individual rotor sheet metal blank of the rotor in FIG. 2.

To this end FIG. 3 shows an individual rotor sheet, for instance the rotor sheet 18. The rotor sheet 18 comprises strip-type magnetic flux conducting sections 28, which each magnetically connect two d-axes of the rotor 10. The flux conducting sections 26 are each magnetically decoupled by the recesses 22. The flux conducting sections 26 are connected to one another by rods, which overall form a peripheral outer ring 26'. Since the casting compound is also not ferromagnetic, the casting compound arranged in the recesses 22 forms a flux barrier 28 in each instance. The rotor 10 thus comprises a particularly low reactance along the q-axes, while it has a high reactance along the extension of the flux conducting sections 26.

In the example shown, the flux barriers 28 are embodied in the shape of an arc. The arcs 30, 32 next to the axis of rotation A comprise a spacing B and B+X alternately along the periphery 34 of the rotor 10, in other words in the peripheral direction. The spacing difference X can lie for instance in a range of 0.5 millimeters up to 50 millimeters. A sectional shape or contour 36 is produced overall in the rotor sheet 18 by the curve of the flux conducting sections 26 and the flux barriers 28. Two adjacent rotor sheets 18, 18' do not lie congruent to one another on account of the asymmetric contour, when the adjacent rotor sheets 18, 18' are arranged rotated by 90 degrees relative to one another for instance.

Figure 4:
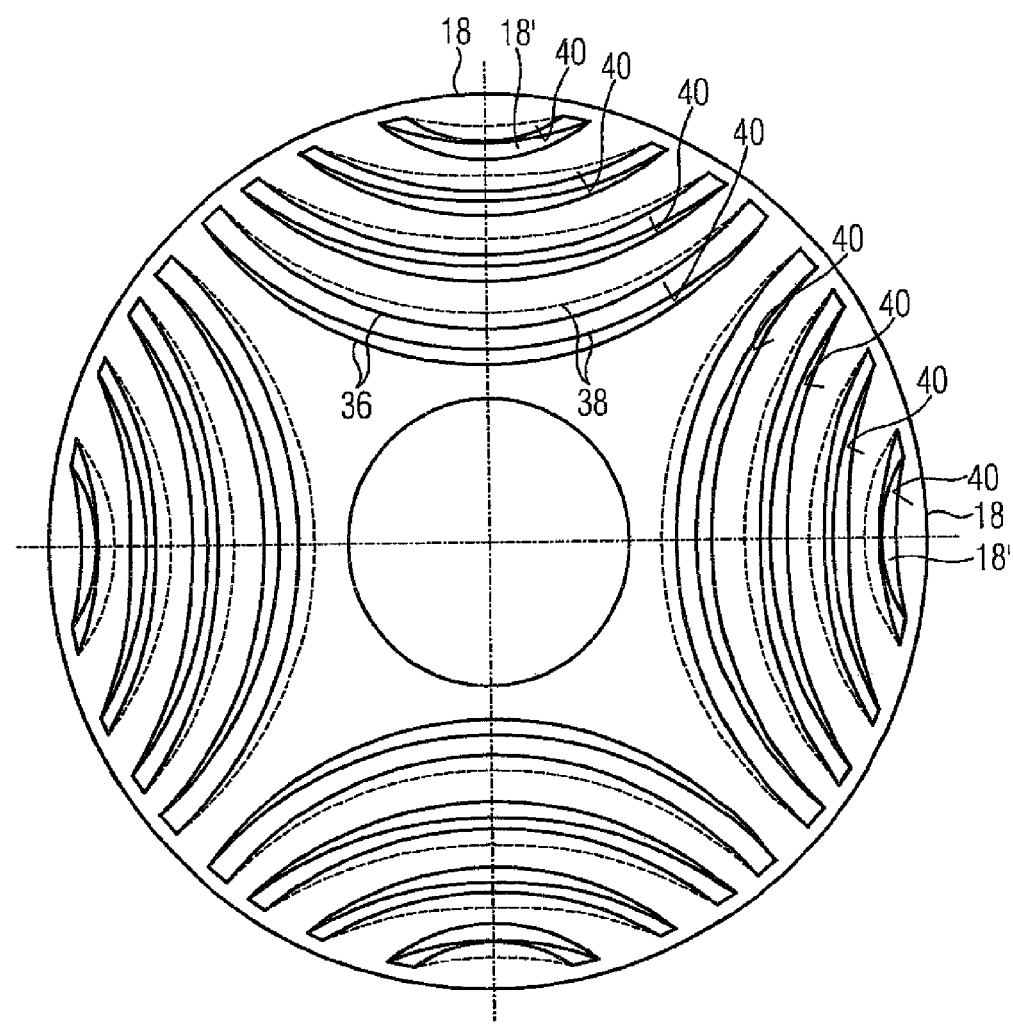
FIG. 4 shows a schematic representation of two rotor sheet metal blanks arranged adjacent to one another in a laminated core of the rotor.

This is illustrated in FIG. 4. FIG. 4 shows the rotor sheet 18 from the front view from the front side 20. The rotor sheet 18' is shown to the rear of rotor sheet 18.

The rotor sheet 18' can comprise a contour 38, which is identical to the contour 36 of the rotor sheet 18. The rotor sheet 18' is rotated about 90 degrees with respect to the rotor sheet 18. For improved differentiation, the front contour 36 of the rotor sheet 18 and the same but rear contour 38 of the rotor sheet 18' which is rotated by 90 degrees is shown in FIG. 4. The contour 38 is partially covered by the rotor sheet 18, which is illustrated by dashed lines.

The twisted arrangement means that the rotor sheet 18' forms an axial delimitation of the flux barriers of the rotor sheet 18 in the region of the flux barriers 28. The casting compound of the flux barriers 28 arranged in the recesses 22 adheres to the axially delimiting surfaces of the rotor sheet 18' so that these surfaces form adhesive surfaces 40. The adhesion of the casting compound of the flux barriers 28 to the adhesive surfaces 40 of the rotor sheet 18' causes a centrifugal force, which acts on the rotor sheet 18' during a rotation of the rotor 10 about the axis of rotation A, to be transmitted as a shearing force onto the casting compound in the flux barriers 28 of the rotor sheet 18.

Figure 5:
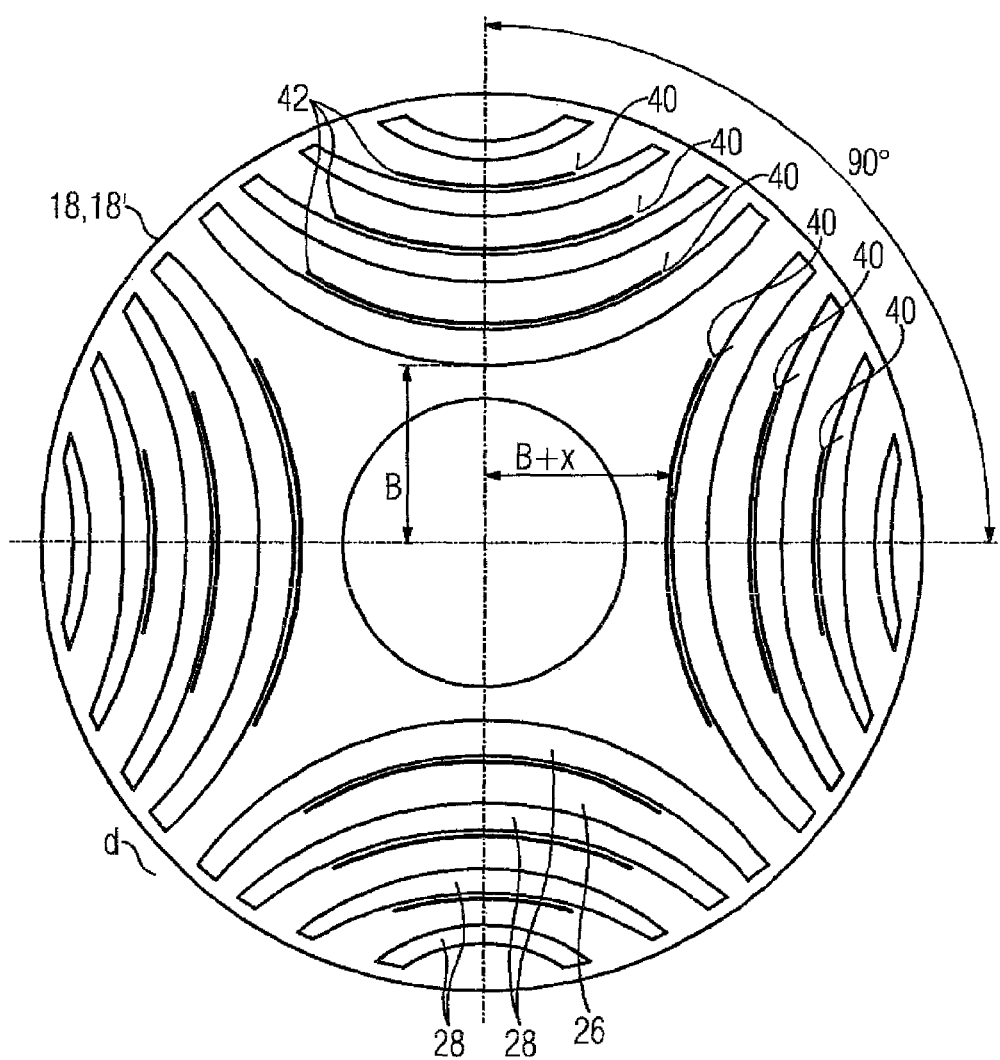
FIG. 5 shows a schematic representation of an individual rotor sheet metal blank of another embodiment of a rotor according to the present invention, depicting depressions in adhesion zones of a rotor sheet metal blank.

To improve the transmission of power, as shown in FIG. 5, a depression 42 can be provided in the region of the adhesive surfaces 40 of a rotor sheet 18, 18', in other words for instance notches or cut-outs or stampings. In other words, a radial arrangement of the recesses along an x-axis and a y-axis which is perpendicular thereto is different in the case of the rotor sheets of the rotor 10.

Figure 6:
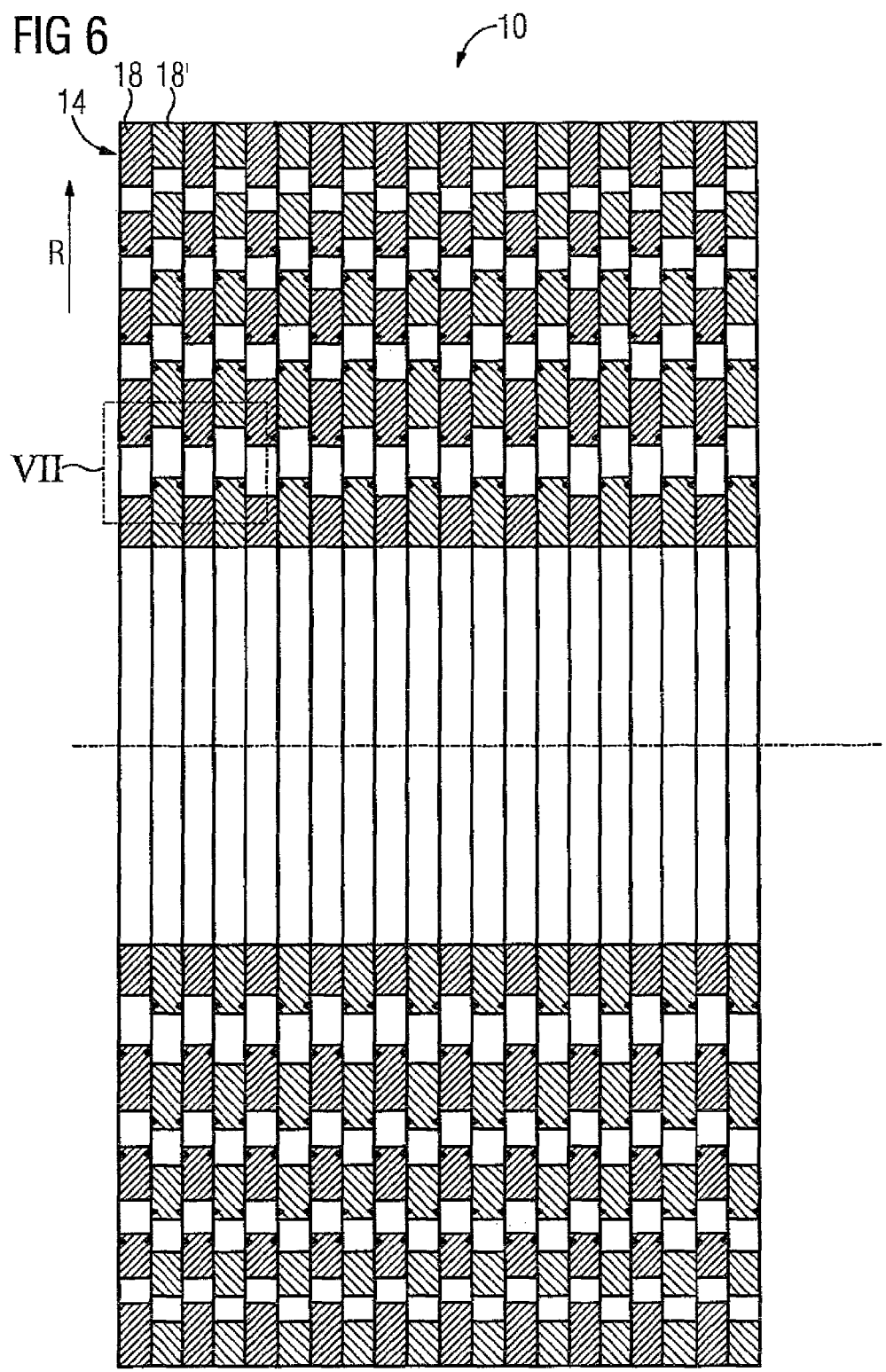
FIG. 6 shows a schematic representation of a longitudinal section of the rotor with rotor sheet metal blanks according to FIG. 5.

FIG. 6 shows how, with the rotor 10, the laminated core 14 has rotor sheets 18, 18' in the longitudinal section, in which a form closure is produced in the radial direction R by the depressions 42. The same reference characters as in FIG. 2 are provided in FIG. 6 for functionally identical elements, in order to preserve the degree of clarity.

Figure 7:
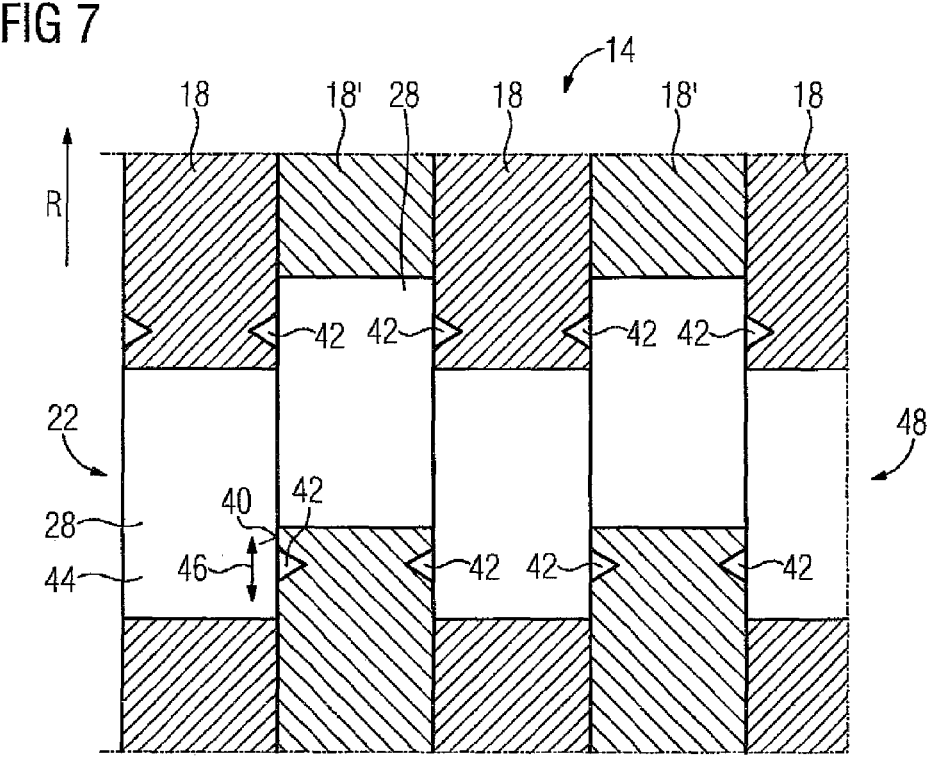
FIG. 7 shows a schematic representation of an enlarged cutout of the longitudinal section in FIG. 6.

FIG. 7 shows a cutout Z from FIG. 6. FIG. 7 shows the rotor sheets 18, 18' with their toothing effected by the depressions 42. Centrifugal forces acting radially in the radial direction R on the rotor sheet 18' are transmitted as shearing forces 46 by the form closure of the depression 42 and by the adhesion to the casting compound 44 in the region of the adhesive surfaces 40, in other words the adhesion is applied to the shearing. Vibration cracks on the radial surfaces therefore do not represent any problem.

The casting compound 44 of the flux barriers 28 arranged in the recesses 22 overall forms a support structure 48 which extends through the laminated core 14, said support structure being arranged in the through openings 24 and overall as a rod being able to discharge radially acting centrifugal forces onto axial ends of the laminated core 14, in other words onto the front side 20 and the opposing rear side of the laminated core 14. The centrifugal forces can be discharged or transmitted to the shaft D by for instance short-circuit rings or end plates.

A manufacturing method for the rotor 10 is described below. The recesses 22 provided for the flux barriers 28 in the rotor sheet 18, 18' are positioned differently in the x- and y-alignment, as shown in FIG. 4, so that axial surfaces 40 result for the linking to the casting compound 44 (FIG. 2 and FIG. 4) when the rotor sheets 18, 18' are stacked. To this end the sheets are packaged twisted in each case by 90 degrees. Alternatively, two sheets can be used, in which all segments are generally arranged radially at different spacings, in other words it is not only the spacings B, B+X which are provided. The clearances or recesses 22 on the stacked rotor laminated core 14 are cast with the stabilizing casting compound 44, which has an adhesion and sheering resistance which is sufficient for a predetermined maximum rotary speed. It can also be considered here that a resin mixture can be used, which dissolves the electrically insulating lacquer of the rotor sheets 18, 18', so that a particularly good adhesion of the casting compound 44 to the rotor sheets 18, 18' is produced.

In addition, form closures can be provided prior to assembly of the laminated core 14 for the surfaces 40 to be applied with casting compound, by depressions 42 being stamped, as is shown in FIG. 5 and FIG. 6 and FIG. 7. As a result, no radial but instead axial contact in the laminated cores results contrary to the known embodiment from the prior art. These form closures nevertheless do not reduce the efficiency of the motor, since no material is in particular removed when stamping the depressions but is instead only displaced.

When an electrically conducting material is used as the casting compound 44, there is the possibility of casting short-circuit rings to the rotor ends, as a result of which a start-up cage is additionally embodied. A closed contour, which connects the individual surfaces of the flux barriers 28, is attached in such cases to the two package ends. When a non conducting material is used as the casting compound, these rings or disks are used purely as supporting elements, by way of which the support structure 48 is held on the shaft D.

By the casting compound 44 being introduced into the through openings 24, the surfaces which are arranged offset are adhered by the casting compound. The adhesive areas are subject to shearing when the rotor 10 is rotating. A high resistance is produced as a result, conversely to a tensile load. The permissible loads with a rotary speed in the radial direction R are increased by the axial form closures in the depressions 42. These form closures nevertheless do not reduce the efficiency of the motor, since the magnetic flux is not impeded.

The relatively unstable rotor sheets with their flux barriers are stabilized with respect to the speed suitability by means of the known manufacturing method. The cast regions, in other words the support structure 48 with its adhesion, counteract a widening of the rotor sheet with rotary speeds of greater than 5,000 revolutions per minute on the adhesive surfaces 40 and if necessary the form closures in the depressions 42.

The example shows how the following advantages can be achieved with a reluctance motor. The rotary speed efficiency of the rotor 10 is increased. The rod width of the connecting rods on the outer diameter along the rotor exterior, in other words the outer ring 26, can be very small. It is also possible to dispense with rods between the flux conducting sections, which have to be provided in the prior art in the case of rotor sheets. Dispensing with the outer rods, i.e. the outer ring 26', between the flux conducting sections 26, is even possible in one embodiment of the invention since the complete compound can be fixed by the support structure 48 made of casting compound 44 and axial end disks. The machining required to adjust the outer diameter of the rotor 10 to a stator on the outer diameter of the rotor 10 is performed more easily by the increased stability of the laminated core 14 and can thus be implemented more cost-effectively. Since it is possible to dispense with a binding for stabilizing the laminated core 14, which has to be wound around the laminated core 14, an optimized air gap L is produced in the reluctance motor. The laminated core 14 of the rotor 10 also comprises an improved intrinsic bending frequency on the runner as a result of the overall compound, as a result of which the rotor laminated core 14 is also suited to stabilizing the shaft D of the reluctance motor. A reduction in the torsion oscillations during operation of the reluctance motor is hereby produced. The rotor can be advantageously operated during assembly as a single, one-piece component.

Figure 8:
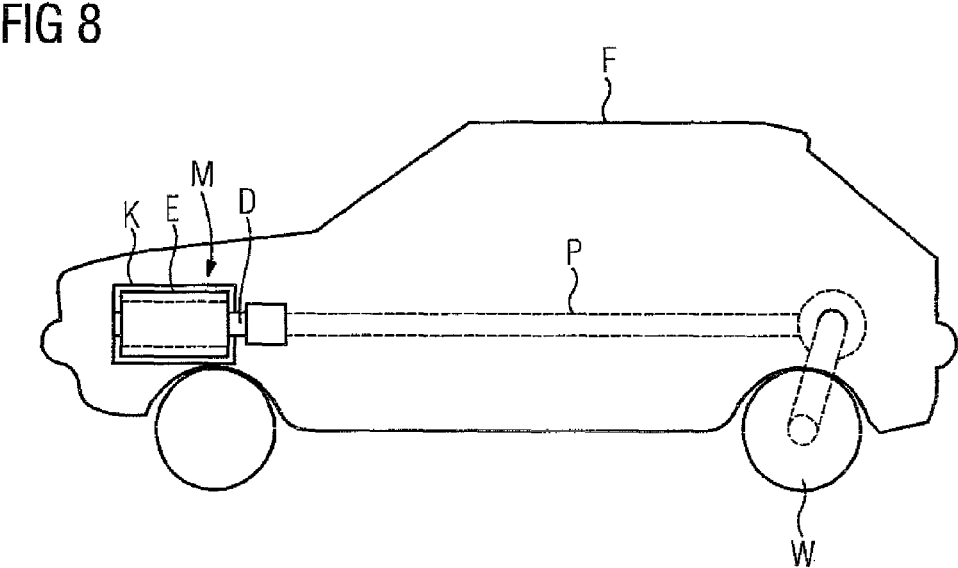
FIG. 8 shows a schematic representation of a motor vehicle having embodied therein a reluctance motor according to the present invention.

A usage possibility for the electric machine E is shown in FIG. 8. FIG. 8 shows a schematic representation of a motor vehicle F, which can be a motor car for instance. The motor vehicle F has an electrical drive motor M, in the housing K of which the electric machine E or another embodiment of the inventive reluctance motor can be found for instance. The shaft D of the electric machine E can be coupled to a drive train P of the motor vehicle F for instance. The drive train P can drive a rear wheel W of the motor vehicle F for instance.

The example shows overall how a reluctance motor can be provided by the invention for an electric vehicle or eCar, the rotor of which is configured for an increased rotary speed.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A rotor for a reluctance motor, comprising a laminated core having a number of rotor sheet metal blanks, each rotor sheet metal blank including flux barriers cast with a non-ferromagnetic casting compound and at least one soft-magnetic rotor sheet which delimits the flux barriers, wherein flux barriers of adjacent rotor sheet metal blanks are arranged offset relative to one another so that the flux barriers of one of the adjacent rotor sheet metal blanks are delimited in an axial direction at least partially by the rotor sheets of the other one of the adjacent rotor sheet metal blanks, with the casting compound of the flux barriers adhering in an adhesion zone to the rotor sheets.

2. The rotor of claim 1, wherein each rotor sheet metal blank comprises a single rotor sheet formed with punches for the flux barriers.

3. The rotor of claim 1, wherein each rotor sheet metal blank comprises a number of rotor sheets separated respectively from one another by a flux barrier.

4. The rotor of claim 1, wherein the flux barriers of the adjacent rotor sheet metal blanks are arranged in radially offset relationship to one another.

5. The rotor of claim 1, wherein the rotor sheet comprises at least one depression formed by a stamping and/or a recess in the adhesion zone, wherein the at least one depression and the casting compound establish a form closure in a radial direction.

6. The rotor of claim 1, wherein the rotor sheet in the adhesion zone is roughened compared to an adjacent region.

7. The rotor of claim 1, wherein the flux barriers of the adjacent rotor sheet metal blanks are arranged in a partially overlapping relationship, with the casting compound of the overlapping flux barriers establishing a single piece support structure in the form of a rod which penetrates the laminated core in its entirety.

8. The rotor of claim 1, wherein the casting compound contains an electrically insulating material.

9. The rotor of claim 8, wherein the electrically insulating material is a polymer or a ceramic.

10. The rotor of claim 1, wherein the laminated core has rotor sheet metal blanks with flux barriers at axial ends thereof, with the flux barriers at each axial end being electrically connected to one another by way of a short-circuit ring formed from the casting compound such that overall a start-up cage of the rotor is formed by the casting compound in the laminated core and the short-circuit rings.

11. The rotor of claim 1, wherein the casting compound contains an electrically conductive material.

12. The rotor of claim 11, wherein the electrically conductive material is aluminum and/or copper.

13. The rotor of claim 1, wherein the at least one rotor sheet of each rotor sheet metal blank has edges which define a contour, with the contours of the rotor sheet metal blanks being the same but arranged twisted relative to one another.

14. A reluctance motor, comprising:
a rotor including a laminated core having a number of rotor sheet metal blanks, each rotor sheet metal blank including flux barriers cast with a non-ferromagnetic casting compound and at least one soft-magnetic rotor sheet which delimits the flux barriers, wherein flux barriers of adjacent rotor sheet metal blanks are arranged offset relative to one another so that the flux barriers of one of the adjacent rotor sheet metal blanks are delimited in an axial direction at least partially by the rotor sheets of the other one of the adjacent rotor sheet metal blanks, with the casting compound of the flux barriers adhering in an adhesion zone to the rotor sheets; and a stator having coils for rotating the rotor at a rotary speed by applying current alternately to the coils.

15. The reluctance motor of claim 14, further comprising a converter configured to alternatingly apply current to the coils and thereby rotate the rotor.

16. A motor vehicle, comprising at least one reluctance motor, said reluctance motor comprising a rotor including a laminated core having a number of rotor sheet metal blanks, each rotor sheet metal blank including flux barriers cast with a non-ferromagnetic casting compound and at least one soft-magnetic rotor sheet which delimits the flux barriers, wherein flux barriers of adjacent rotor sheet metal blanks are arranged offset relative to one another so that the flux barriers of one of the adjacent rotor sheet metal blanks are delimited in an axial direction at least partially by the rotor sheets of the other one of the adjacent rotor sheet metal blanks, with the casting compound of the flux barriers adhering in an adhesion zone to the rotor sheets, said reluctance motor comprising a stator having coils for rotating the rotor at a rotary speed by applying current alternatingly to the coils.

17. The motor vehicle of claim 16, wherein the reluctance motor comprises a converter configured to alternatingly apply current to the coils and thereby rotate the rotor.

18. A method for manufacturing a rotor comprising:
forming recesses in a soft-magnetic sheet for a rotor sheet metal blanks to establish flux barriers;
axially threading a plurality of said sheet such that axially adjacent recesses are arranged partially offset relative to one another so that each of the flux barriers is axially delimited by an adhesion zone of an adjacent one of the sheets; and
casting the recesses with a non-ferromagnetic casting compound to thereby arrange the casting compound in the recesses and apply the casting compound to the adhesion zones.

* * * * *